United States Patent
Bialer

(10) Patent No.: US 12,372,639 B2
(45) Date of Patent: Jul. 29, 2025

(54) DOPPLER RADAR RESOLUTION BASED ON INERTIAL MEASUREMENT UNIT OF VEHICLE

(71) Applicant: GM Global Technology Operations LLC, Detroit, MI (US)

(72) Inventor: Oded Bialer, Petach Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 414 days.

(21) Appl. No.: 17/946,322

(22) Filed: Sep. 16, 2022

(65) Prior Publication Data
US 2024/0094376 A1   Mar. 21, 2024

(51) Int. Cl.
G01S 13/58     (2006.01)
G01S 7/35      (2006.01)
G01S 13/931    (2020.01)

(52) U.S. Cl.
CPC ........... *G01S 13/584* (2013.01); *G01S 7/356* (2021.05); *G01S 13/931* (2013.01); *G01S 2013/932* (2020.01)

(58) Field of Classification Search
None
See application file for complete search history.

(56) References Cited

U.S. PATENT DOCUMENTS

| 2022/0099817 A1* | 3/2022 | Crouch | G01S 13/426 |
| 2023/0131090 A1* | 4/2023 | Li | G01S 13/347 |
| | | | 342/130 |

\* cited by examiner

*Primary Examiner* — Vladimir Magloire
*Assistant Examiner* — Brandon James Henson
(74) *Attorney, Agent, or Firm* — CANTOR COLBURN LLP

(57) ABSTRACT

A system in a vehicle includes a transmitter of a radar system to transmit energy and a receiver of the radar system to receive reflections based on reflection of the energy transmitted by the transmitter by one or more objects. The system also includes a controller to process the reflections obtained during a predefined duration to estimate a range, azimuth angle, and relative velocity for each of the one or more objects by obtaining acceleration information from an inertial measurement unit (IMU) of the vehicle. An operation of the vehicle is controlled based on information about the one or more objects from the radar system.

20 Claims, 3 Drawing Sheets

DOPPLER RADAR RESOLUTION BASED ON INERTIAL MEASUREMENT UNIT OF VEHICLE

INTRODUCTION

The subject disclosure relates to improved Doppler radar resolution based on an inertial measurement unit (IMU) of a vehicle.

Vehicles (e.g., automobiles, trucks, construction equipment, farm equipment, automated factory equipment) include a number of sensors that provide information about the vehicle and its surrounding environment. For example, radar systems, lidar systems, and cameras may be used to obtain information about objects surrounding the vehicle while steering angle sensors, IMUs, tire pressure monitoring sensors and the like may provide information about the vehicle itself. The radar system may provide range, azimuth angle, and Doppler (i.e., relative velocity) for objects in its field of view. When detecting stationary objects, the Doppler provides velocity of the vehicle itself. Accordingly, it is desirable to provide improved Doppler radar resolution based on the IMU of the vehicle.

SUMMARY

In one exemplary embodiment, a system in a vehicle includes a transmitter of a radar system to transmit energy and a receiver of the radar system to receive reflections based on reflection of the energy transmitted by the transmitter by one or more objects. The system also includes a controller to process the reflections obtained during a predefined duration to estimate a range, azimuth angle, and relative velocity for each of the one or more objects by obtaining acceleration information from an inertial measurement unit (IMU) of the vehicle. An operation of the vehicle is controlled based on information about the one or more objects from the radar system.

In addition to one or more of the features described herein, the transmitter transmits the energy as a plurality of chirps. Each of the plurality of chirps is a linear frequency-modulated continuous wave signal.

In addition to one or more of the features described herein, the controller performs a fast Fourier transform (FFT) over a set of range intervals, referred to as range bins, for each of the reflections to obtain a range map indicating an energy level per range bin and chirp.

In addition to one or more of the features described herein, the controller performs a second FFT over a set of hypotheses of Doppler frequency for each range bin of the range map to obtain a range-Doppler map indicating the energy level per range bin and Doppler frequency.

In addition to one or more of the features described herein, the controller obtains a data cube indicating the energy level per range bin, Doppler frequency, and a set of hypotheses of azimuth angle based on the range-Doppler map.

In addition to one or more of the features described herein, the radar system includes two or more transmitters and two or more receivers and the controller is configured to obtain the range-Doppler map for each pair of the two or more transmitters and the two or more receivers and to obtain the data cube based on combining the range-Doppler map obtained for each pair of the two or more transmitters and the two or more receivers.

In addition to one or more of the features described herein, the energy level per range bin and each Doppler frequency is determined as:

$$z(f) = \sum_{n=0}^{N-1} x_n e^{-j2\pi(\lambda ft + 0.5\alpha t^2)\frac{2}{\lambda}},$$

the wavelength of the transmit energy is $\lambda$, N is the number of chirps, t is time over the predefined duration, $x_n$ is the energy level per range bin and chirp, and $\alpha$ is the acceleration information from the IMU, n is the chirp index, and $f$ is the Doppler frequency.

In addition to one or more of the features described herein, the controller identifies the range bin and the Doppler frequency for each azimuth angle associated with the energy level of the range-Doppler map exceeding a threshold value.

In addition to one or more of the features described herein, the controller identifies the reflections associated with static objects among the one or more objects based on clustering the Doppler frequency for which the energy level of the range-Doppler map exceeds the threshold value.

In addition to one or more of the features described herein, the controller estimates velocity of the vehicle based on the Doppler frequency associated with the static objects.

In another exemplary embodiment, a non-transitory computer-readable medium stores instructions that, when processed by one or more processors of a vehicle, cause the one or more processors to implement a method. The method includes obtaining reflections received by a receiver of a radar system of the vehicle based on reflection of energy transmitted by a transmitter of the radar system by one or more objects. The method also includes processing the reflections obtained during a predefined duration to estimate a range, azimuth angle, and relative velocity for each of the one or more objects by obtaining acceleration information from an inertial measurement unit (IMU) of the vehicle. An operation of the vehicle is controlled based on information about the one or more objects from the radar system.

In addition to one or more of the features described herein, the transmitter transmits the energy as a plurality of chirps. Each of the plurality of chirps is a linear frequency-modulated continuous wave signal.

In addition to one or more of the features described herein, the method includes performing a fast Fourier transform (FFT) over a set of range intervals, referred to as range bins, for each of the reflections to obtain a range map indicating an energy level per range bin and chirp.

In addition to one or more of the features described herein, the method includes performing a second FFT over a set of hypotheses of Doppler frequency for each range bin of the range map to obtain a range-Doppler map indicating the energy level per range bin and Doppler frequency.

In addition to one or more of the features described herein, the method includes obtaining a data cube indicating the energy level per range bin, Doppler frequency, and a set of hypotheses of azimuth angle based on the range-Doppler map.

In addition to one or more of the features described herein, the radar system includes two or more transmitters and two or more receivers and the method includes obtaining the range-Doppler map for each pair of the two or more transmitters and the two or more receivers and obtaining the data cube based on combining the range-Doppler map obtained for each pair of the two or more transmitters and the two or more receivers.

In addition to one or more of the features described herein, the energy level per range bin and each Doppler frequency is determined as:

$$z(f) = \sum_{n=0}^{N-1} x_n e^{-j2\pi(\lambda ft + 0.5at^2)\frac{2}{\lambda}},$$

the wavelength of the transmit energy is $\lambda$, N is the number of chirps, t is time over the predefined duration, $x^n$ is the energy level per range bin and chirp, and a is the acceleration information from the IMU, n is the chirp index, and $f$ is the Doppler frequency.

In addition to one or more of the features described herein, the method includes identifying the range bin and the Doppler frequency for each azimuth angle associated with the energy level of the range-Doppler map exceeding a threshold value.

In addition to one or more of the features described herein, the method includes identifying the reflections associated with static objects among the one or more objects based on clustering the Doppler frequency for which the energy level of the range-Doppler map exceeds the threshold value.

In addition to one or more of the features described herein, the method includes estimating velocity of the vehicle based on the Doppler frequency associated with the static objects.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
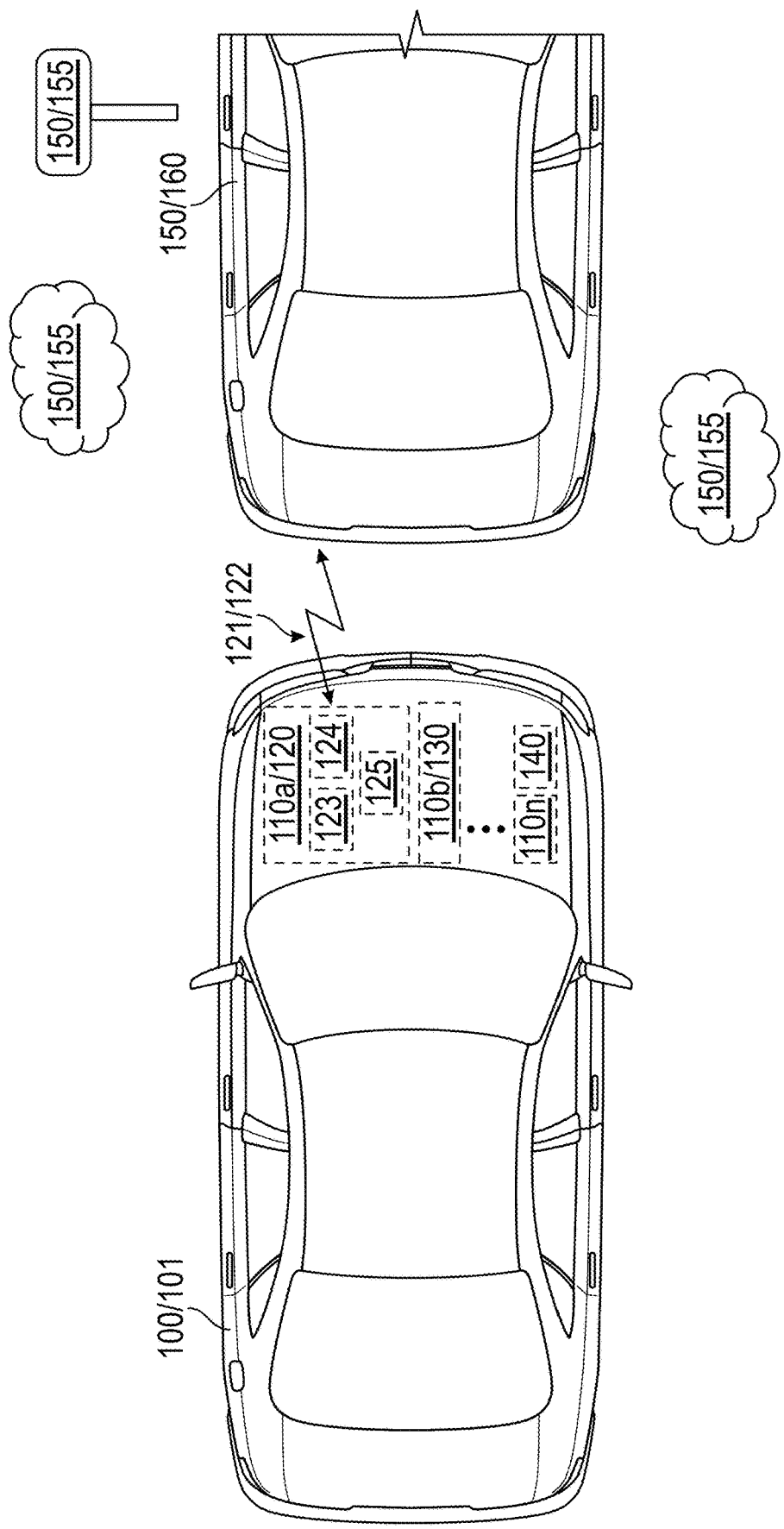
FIG. 1 is a block diagram of a vehicle that implements improved Doppler radar resolution based on an inertial measurement unit (IMU)

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to improved Doppler radar resolution based on the IMU of the vehicle. Generally, the Doppler processing in a vehicle assumes a constant radial velocity and, thus, a linear range migration over time. Doppler processing refers to determining a frequency shift between a pulse transmitted by the radar system and a received reflection resulting from the transmitted pulse being reflected by an object. The frequency shift results from and indicates relative velocity of the object, relative to the radar system. Because a constant radial velocity is assumed for Doppler processing, the frame duration over which Doppler processing is performed is short (e.g., on the order of 20 milliseconds) to ensure that the assumption holds. However, Doppler resolution is proportional to frame duration.

According to one or more embodiments, the IMU of the vehicle is used to increase the frame duration of Doppler processing by the radar system of the vehicle. The IMU may indicate acceleration, heading angle, and relative position. By using the acceleration from the IMU, the equivalent linear range migration over a (longer) frame duration may be used for Doppler processing. The increased frame duration of Doppler processing results in improved Doppler resolution. When stationary objects are detected, the improved Doppler resolution provides an improved accuracy in the estimation of velocity of the radar system (i.e., vehicle) itself. Based on this improved estimation of vehicle motion, radar data may be fused with data from higher resolution sensors like lidar systems and cameras. The Doppler information, alone or fused with other sensor data, may ultimately be used to control aspects of vehicle operation.

In accordance with an exemplary embodiment, FIG. 1 is a block diagram of a vehicle 100 that implements improved Doppler radar resolution based on an IMU 130. The exemplary vehicle 100 shown in FIG. 1 is an automobile 101. The vehicle 100 is shown with several sensors 110a through 110n (generally referred to as 110). The sensor 110a is a radar system 120 and the sensor 110b is an IMU 130. Additional sensors 110 may include one or more cameras, a lidar system, a steering angle sensor, rain sensor, and any number of known vehicle sensors. The numbers and locations of the sensors 110 in and on the vehicle 100 are not limited by the general depiction in FIG. 1.

Some of the sensors 110, such as the radar system 120, may detect objects 150 around the vehicle 100. The radar system 120 may transmit energy 121 from one or more transmitters 123 in the form of a liner frequency modulated continuous wave, referred to as a chirp. The portion of the transmitted energy that is reflected back as a reflection 122 to the radar system 120 by an object 150 is received by one or more receivers 124 and processed. The processing includes Doppler processing, as further discussed with reference to FIG. 3. As illustrated, the objects 150 may be stationary or static objects 155 (e.g., bushes, signs) or may be moving objects 160 (e.g., another vehicle). When the objects 150 are moving objects 160, the result of Doppler processing indicates a relative velocity between the vehicle 100 and the moving object 160. When the objects 150 are static objects 155, the result of Doppler processing indicates velocity of the vehicle 100 itself.

As previously noted, the frame duration over which Doppler processing is performed is limited by the duration over which the range migration of the vehicle 100 can be assumed to be linear (i.e., the duration over which radial velocity of the vehicle 100 is constant). That is velocity v(t) is assumed to be $v_0$, a constant. By using the IMU 130, velocity v(t) may be determined as a sum of $v_0$, the velocity at the start of a frame, and g(t), the velocity variation (i.e., acceleration) over the frame duration. By deducing the range variation due to the acceleration (g(t)) or, put another way, by compensating for range variations resulting from acceleration over the frame duration, a liner representation of range migration of the vehicle 100 can be generated over the frame duration. The linear representation facilitates Doppler processing, and by performing Doppler processing over this longer frame duration, the Doppler resolution is increased.

The vehicle 100 may also include a controller 140. The controller 140 may control one or more aspects of the operation of the vehicle 100. The controller 140 may use input from one or more sensors 110 to control vehicle operation. The controller 140, alone or with a controller 125 within the radar system 120 may implement aspects of the processes detailed with reference to FIG. 2. The controller 140 and any additional controller 125 within the radar system 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The memory of the processing circuitry may include a non-transitory computer-readable medium that stores instructions that, when processed by one or more of the processors of the processing circuitry, perform processes detailed herein.

Figure 2:
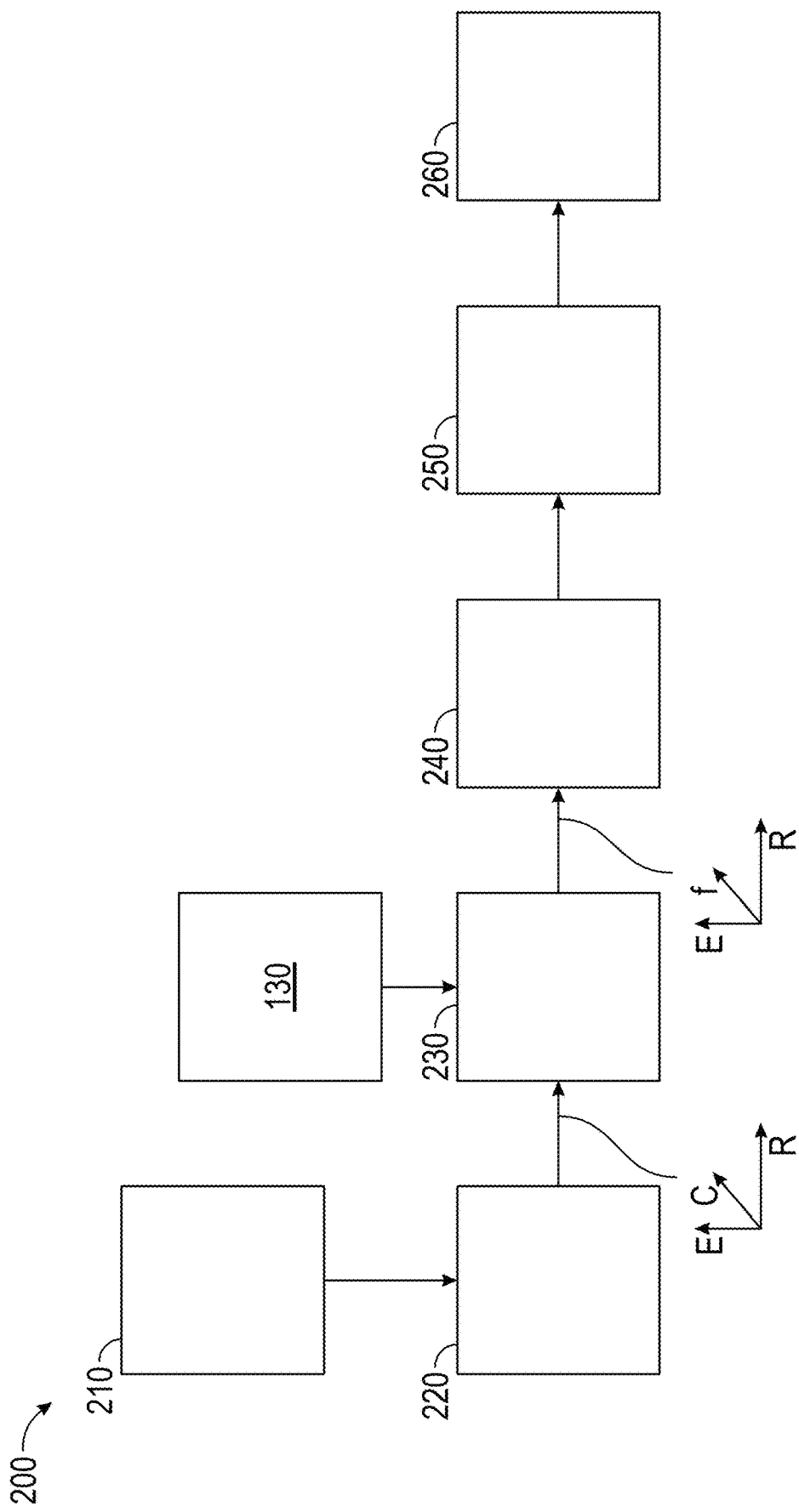
FIG. 2 is a process flow of a method of using an IMU to increase frame duration for Doppler processing in a radar system according to one or more embodiments.

FIG. 2 is a process flow of a method 200 of using an IMU 130 to increase frame duration for Doppler processing in a radar system 120 according to one or more embodiments. The processes may be performed by the controller 140 of the vehicle 100, a controller 125 of the radar system 120, or a combination of the two. As previously noted, the acceleration information from the IMU 130 is used to account for non-linearity in range migration over a longer frame duration than is typically used for Doppler processing. Compensating for this acceleration allows the assumption of linear range migration over the frame duration to hold over a longer frame duration, thereby facilitating Doppler processing over the longer frame duration. Doppler processing over the longer frame duration increases Doppler resolution.

At block 210, transmitting energy 121 and receiving reflections 122 may involve the radar system 120 transmitting chirps, for example. At block 220, performing a range fast Fourier transform (FFT) per transmission refers to performing an FFT across a predefined number of range intervals, referred to as range bins (R), for the reflections 122 received as a result of each transmission (e.g., N transmissions and associated reflections 122). The FFT result is a range map, which is an indication of received energy (E), over the set of range bins (R) and the set of transmissions (e.g., chirps (C)) results from the processes at block 220.

At block 230, obtaining the Doppler processing output includes using information from the IMU 130, as indicated. The result of the Doppler processing is a range-Doppler map, which is an indication of energy over the range bins (R) and over a set of Doppler hypotheses ($f$), which are a set of potential Doppler frequencies $f$ associated with potential relative velocity values for the objects 150 that gave rise to the reflections 122. Specifically, at block 230, for each range bin, for a given Doppler hypothesis $f$, the energy level is computed as:

$$z(f) = \sum_{n=0}^{N-1} x_n e^{-j2\pi(\lambda f t + 0.5 a t^2)\frac{2}{\lambda}} \quad \text{[EQ. 1]}$$

As EQ. 1 indicates, the energy level $x_n$ for each range bin over the N reflections 122 is combined. The wavelength $\lambda$ of the transmitted energy 121, the time t over the frame duration for the Doppler processing, which is associated with the N transmissions, and the acceleration a from the IMU 130 are also used.

At block 240, detecting peaks refers to detecting the range bin and Doppler hypotheses for which the associated energy level exceeds a predefined threshold value (e.g., noise level). This peak detection may be done for a number of azimuth angles θ. That is, each reflection 122 resulting from the N transmissions may be received from one a number of azimuth angles θ relative to the radar system 120. The range-Doppler map obtained at block 230 is obtained for each transmitter-receiver pair when multiple transmitters 123 and receivers 124 are used. In a process referred to as beamforming, the range-Doppler maps may be combined for each hypothesis of an azimuth angle θ. Thus, the range, Doppler hypothesis, and azimuth angle θ associated with an energy level above the predefined threshold value may be determined at block 240. The inclusion of acceleration a from the IMU 130 at block 230 facilitates a longer frame duration (i.e., higher value for N). This, in turn, results in detections, at block 240, with higher signal-to-noise ratio (SNR) and higher Doppler resolution that enables improved discrimination among objects travelling at similar speeds.

Figure 3:
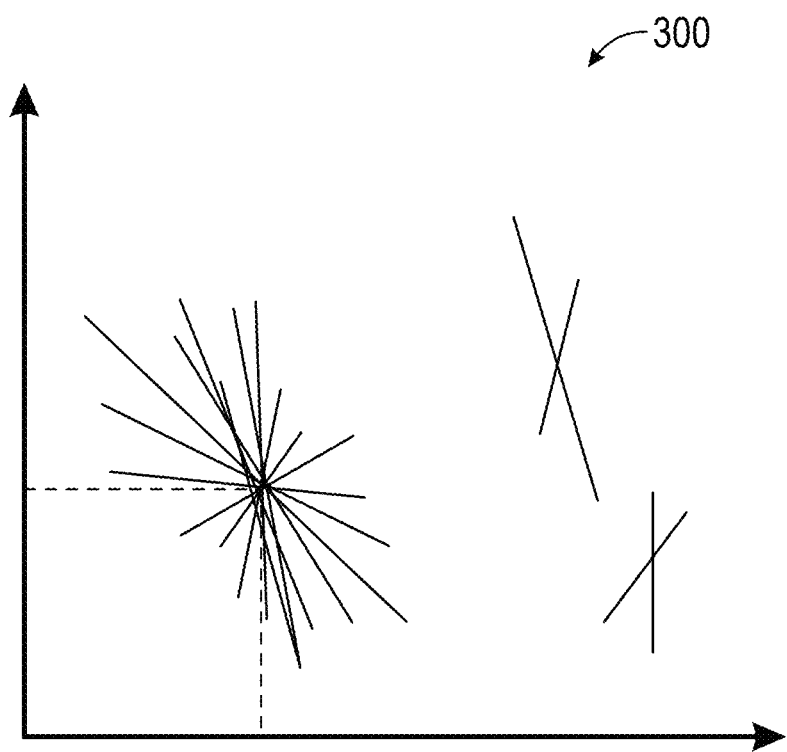
FIG. 3 shows Doppler hypotheses that exceed a threshold energy level.

The processes at blocks 250 and 260 are discussed with reference to FIG. 3. FIG. 3 shows Doppler hypotheses 300 from block 240. That is, the Doppler hypotheses 300 are associated with peaks detected at block 240. The Doppler hypotheses are indicated by the lines and represent velocity components Vx and Vy. At block 250, detecting static objects 155 requires classifying the Doppler hypotheses 300 from block 240. Generally, there are more static objects 155 than moving objects 160 in a scene and, thus, more reflections 122 from static objects 155. As a result, the higher density of lines, as shown on the left in FIG. 3, is detected as pertaining to static objects 155. Any known clustering approach may be used to identify the Doppler hypotheses 300 pertaining to static objects 155. The intersection of the cluster (indicated as Vx' and Vy') provides an estimate of the velocity of the vehicle 100. This intersection may be found via a least squares approach at block 260.

More particularly, a least squares solution may be used to estimate the velocity of the vehicle 100, at block 260, based on:

$$\begin{bmatrix} f_0 \\ f_1 \\ \vdots \end{bmatrix} = \begin{bmatrix} \sin(\theta_0) & \cos(\theta_0) \\ \sin(\theta_1) & \cos(\theta_1) \\ \vdots & \vdots \end{bmatrix} \begin{bmatrix} v'_x \\ v'_y \end{bmatrix} \quad \text{[EQ. 2]}$$

The Doppler frequencies $f=[f_0, f_1 \ldots]$ and a matrix G based on azimuth angles $[\theta_0, \theta_1 \ldots]$ of each static object 155 identified at block 250 are used in EQ. 2 to estimate the radial velocity components vx' and vy' of the vehicle 100. EQ. 2 may be represented as:

$$f = G \begin{bmatrix} v'_x \\ v'_y \end{bmatrix} \quad \text{[EQ. 3]}$$

The velocity of the vehicle 100 is given by:

$$v(t) = v_0 + g(t) \quad \text{[EQ. 4]}$$

The initial velocity of the vehicle 100 ($v_0$) at the start of the frame is given by:

$$v_0 = (G^H G)^{-1} G^H f \quad \text{[EQ. 5]}$$

In EQ. 4, g(t) is the acceleration provided by the IMU 130. In EQ. 5, H refers to the Hermitian transpose operation on the matrix G.

As previously noted, the velocity of the vehicle 100 that is estimated at block 260 is a higher resolution estimate than would be possible without using the IMU 130. Specifically, the IMU 130 facilitates using a longer frame duration over which the transmission and reception at block 210 are performed and, thus, more reflections 122 that are processed beginning at block 220. The radar system 120 provides estimates of range, azimuth, and Doppler for each detected object 150. These estimates are improved based on the higher resolution velocity estimate for the vehicle 100 and higher SNR due to the longer integration duration. In addition, fusion of data from the radar system 120 with data from other sensors 110 (e.g., lidar system, camera) is also improved. Ultimately, the data from the radar system 120 facilitates control of one or more operations of the vehicle 100 based on detection of objects 150.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. Unless defined otherwise, technical and scientific terms used herein have the same meaning as is commonly understood by one of skill in the art to which this invention belongs.

What is claimed is:

1. A system in a vehicle comprising:
   a transmitter of a radar system configured to transmit energy;
   a receiver of the radar system configured to receive reflections based on reflection of the energy transmitted by the transmitter by one or more stationary objects;
   a controller configured to process the reflections obtained during a predefined duration to estimate a range, azimuth angle, and relative velocity for each of the one or more objects by obtaining a set of information from an inertial measurement unit (IMU) of the vehicle, wherein the set of information includes an acceleration, heading angle, and relative position of the vehicle, and wherein an operation of the vehicle is controlled based on information about the one or more objects from the radar system; and wherein the predefined duration is longer than a duration of time over which a range migration of the vehicle is linear;
   wherein an energy level per range bin and each Doppler frequency is determined as:

$$z(f) = \sum_{n=0}^{N-1} x_n e^{-j2\pi(\lambda ft + 0.5at^2)2/\lambda},$$

the wavelength of the transmit energy is $\lambda$, N is the number of chirps, t is time over the predefined duration, $x_n$ is the energy level per range bin and chirp, and a is a velocity variation of the vehicle over the predefined duration as determined by the set of information from the IMU, n is the chirp index, and $f$ is the Doppler frequency; and
   wherein the range migration of the vehicle is determined using the set of information from the IMU.

2. The system according to claim 1, wherein the transmitter is configured to transmit the energy as a plurality of chirps, wherein each of the plurality of chirps is a linear frequency-modulated continuous wave signal.

3. The system according to claim 2, wherein the controller is configured to perform a fast Fourier transform (FFT) over a set of range intervals, referred to as range bins, for each of the reflections to obtain a range map indicating an energy level per range bin and chirp.

4. The system according to claim 3, wherein the controller is configured to perform a second FFT over a set of hypotheses of Doppler frequency for each range bin of the range map to obtain a range-Doppler map indicating the energy level per range bin and Doppler frequency.

5. The system according to claim 4, wherein the controller is configured to obtain a data cube indicating the energy level per range bin, Doppler frequency, and a set of hypotheses of azimuth angle based on the range-Doppler map.

6. The system according to claim 5, wherein the radar system includes two or more transmitters and two or more receivers and the controller is configured to obtain the range-Doppler map for each pair of the two or more transmitters and the two or more receivers and to obtain the data cube based on combining the range-Doppler map obtained for each pair of the two or more transmitters and the two or more receivers.

7. The system according to claim 5, wherein the controller is configured to identify the range bin and the Doppler frequency for each azimuth angle associated with the energy level of the range-Doppler map exceeding a threshold value.

8. The system according to claim 7, wherein the controller is configured to identify the reflections associated with static objects among the one or more objects based on clustering the Doppler frequency for which the energy level of the range-Doppler map exceeds the threshold value.

9. The system according to claim 8, wherein the controller is configured to estimate velocity of the vehicle based on the Doppler frequency associated with the static objects.

10. A non-transitory computer-readable medium storing instructions that, when processed by one or more processors of a vehicle, cause the one or more processors to implement a method comprising:
    obtaining reflections received by a receiver of a radar system of the vehicle based on reflection of energy transmitted by a transmitter of the radar system by one or more stationary objects;
    processing the reflections obtained during a predefined duration to estimate a range, azimuth angle, and relative velocity for each of the one or more objects by obtaining a set of information from an inertial measurement unit (IMU) of the vehicle, wherein the set of information includes an acceleration, heading angle, and relative position of the vehicle, and wherein an operation of the vehicle is controlled based on information about the one or more objects from the radar system;
    wherein the predefined duration is longer than a duration of time over which a range migration of the vehicle is linear and exceeds 20 ms;
    wherein an energy level per range bin and each Doppler frequency is determined as:

$$z(f) = \sum_{n=0}^{N-1} x_n e^{-j2\pi(\lambda ft + 0.5 a t^2)2/\lambda},$$

the wavelength of the transmit energy is $\lambda$, N is the number of chirps, t is time over the predefined duration, $x_n$ is the energy level per range bin and chirp, and $\alpha$ is a velocity variation of the vehicle over the predefined duration as determined by the acceleration information from the IMU, n is the chirp index, and $f$ is the Doppler frequency; and wherein the range migration of the vehicle is determined using the set of information from the IMU.

11. The non-transitory computer-readable medium according to claim 10, wherein the transmitter is configured to transmit the energy as a plurality of chirps, wherein each of the plurality of chirps is a linear frequency-modulated continuous wave signal.

12. The non-transitory computer-readable medium according to claim 11, wherein the method includes performing a fast Fourier transform (FFT) over a set of range intervals, referred to as range bins, for each of the reflections to obtain a range map indicating an energy level per range bin and chirp.

13. The non-transitory computer-readable medium according to claim 12, wherein the method includes performing a second FFT over a set of hypotheses of Doppler frequency for each range bin of the range map to obtain a range-Doppler map indicating the energy level per range bin and Doppler frequency.

14. The non-transitory computer-readable medium according to claim 13, wherein the method includes obtaining a data cube indicating the energy level per range bin, Doppler frequency, and a set of hypotheses of azimuth angle based on the range-Doppler map.

15. A non-transitory computer-readable medium storing instructions that, when processed by one or more processors of a vehicle, cause the one or more processors to implement a method comprising:
obtaining reflections received by a receiver of a radar system of the vehicle based on reflection of energy transmitted by a transmitter of the radar system by one or more stationary objects;
processing the reflections obtained during a predefined duration to estimate a range, azimuth angle, and relative velocity for each of the one or more objects by obtaining a set of information from an inertial measurement unit (IMU) of the vehicle, wherein the set of information includes an acceleration, heading angle, and relative position of the vehicle, and wherein an operation of the vehicle is controlled based on information about the one or more objects from the radar system; and
wherein the predefined duration is longer than a duration of time over which a range migration of the vehicle is linear and exceeds 20 ms; and
wherein the range migration of the vehicle is determined using the set of information from the IMU;
wherein the transmitter is configured to transmit the energy as a plurality of chirps, wherein each of the plurality of chirps is a linear frequency-modulated continuous wave signal;
wherein the method includes performing a fast Fourier transform (FFT) over a set of range intervals, referred to as range bins, for each of the reflections to obtain a range map indicating an energy level per range bin and chirp;
wherein the method includes obtaining a data cube indicating the energy level per range bin, Doppler frequency, and a set of hypotheses of azimuth angle based on the range-Doppler map;
wherein the energy level per range bin and each Doppler frequency is determined as:

$$z(f) = \sum_{n=0}^{N-1} x_n e^{-j2\pi(\lambda ft + 0.5 a t^2)2/\lambda},$$

the wavelength of the transmit energy is $\lambda$, N is the number of chirps, t is time over the predefined duration, $x_n$ is the energy level per range bin and chirp, and $\alpha$ is a velocity variation of the vehicle over the predefined duration as determined by the set of information from the IMU, n is the chirp index, and $f$ is the Doppler frequency.

16. The non-transitory computer-readable medium according to claim 15, wherein the radar system includes two or more transmitters and two or more receivers and the method includes obtaining the range-Doppler map for each pair of the two or more transmitters and the two or more receivers and obtaining the data cube based on combining the range-Doppler map obtained for each pair of the two or more transmitters and the two or more receivers.

17. The non-transitory computer-readable medium according to claim 15, wherein the method includes identifying the range bin and the Doppler frequency for each azimuth angle associated with the energy level of the range-Doppler map exceeding a threshold value.

18. The non-transitory computer-readable medium according to claim 17, wherein the method includes identifying the reflections associated with static objects among the one or more objects based on clustering the Doppler frequency for which the energy level of the range-Doppler map exceeds the threshold value.

19. The non-transitory computer-readable medium according to claim 18, wherein the method includes estimating velocity of the vehicle based on the Doppler frequency associated with the static objects.

20. The system according to claim 1, wherein the duration is greater than 20 ms.

* * * * *